UNITED STATES PATENT OFFICE.

JOHN HOLLWAY, OF LONDON, GREAT BRITAIN.

PRODUCTION OF SULPHUR, COPPER-MATTE, &c., FROM PYRITES.

SPECIFICATION forming part of Letters Patent No. 234,129, dated November 9, 1880.

Application filed March 27, 1879. Patented in England March 21, 1878, and November 9, 1878.

*To all whom it may concern:*

Be it known that I, JOHN HOLLWAY, of No. 7 Jeffrey's Square, in the city of London and Kingdom of Great Britain, have invented new and useful Improvements in the Production of Sulphur, Copper-Matte, &c., from Pyrites, of which the following is a specification, and for which invention I have obtained Letters Patent in England under date of March 21, 1878, No. 1,131, and November 9, 1878, No. 4,549.

The invention relates to a new process for treating pyrites or cupreous-iron pyrites; and it has for its object, first, to obtain sulphur in the form of free crude sulphur and sulphurous acid or sulphureted hydrogen, copper, and other metals at one and the same operation; second, to reduce the cost of the treatment by availing myself of certain properties of the sulphides and utilizing them in lieu of the usual carbonaceous fuel heretofore employed, and, third, in utilizing the gases and vapors, all as hereinafter described.

So far as I am aware, no attempts have been made (at least no successful attempts) to treat pyrites upon a large scale, and obtain therefrom, at one and the same operation, their metallic and other constituents. Pyrites heretofore have been treated either to obtain sulphur at the expense of the metallic constituents or to obtain copper at the expense of the sulphur and such other metals as may be combined with the pyrites. The latter has up to the present time been carried on in Spain only, on an extensive scale, and the process in use consists, chiefly, in the three following steps, viz: calcination, lixiviation, and precipitation—a process occupying much time and resulting in the loss of the sulphur, the process being carried out in the open air, to the detriment of all vegetable growth within an extensive radius of the works.

By my improved process of treating pyrites I obtain, first, nearly the whole of the sulphur from the pyrites as crude free sulphur and sulphurous acid or sulphureted hydrogen; second, in separate groups the metals originally contained in the pyrites and other substances operated upon, either in the form of sulphides or oxides, or in the metallic state; third, a slag rich in iron, from which metallic iron can be obtained.

In carrying out the invention I employ a furnace purposely constructed for the operation, or a fixed furnace, such as a modification of the ordinary blast-furnace and the Bessemer converter or a modified Bessemer converter. By preference I employ both descriptions of furnace, so arranged that the free sulphur, sulphurous acid, and the metallic and other substances carried over by the vapors are collected. This can be effected by somewhat similar means to those employed for collecting and utilizing the gases from blast-furnaces.

When commencing the operation I smelt a quantity of pyrites by means of carbonaceous fuel until a bath of molten sulphides has collected or formed on the hearth. I prefer, however, to run into the furnace a quantity of molten sulphide of iron, which may be obtained by smelting pyrites in a cupola, or in any other desired manner, and then introduce at or near the top of the furnace the pyrites or sulphides with or without other metalliferous substances and slag-producing materials. As the pyrites descend the heat evolved from the oxidation or combustion of the sulphides in the lower part of the furnace under the action of a blast of air causes part or one equivalent of the sulphur contained in the pyrites to be driven off by vaporization or distillation from the pyrites above the fusion-zone as free crude sulphur, and, as the pyrites melt, the remaining sulphur is driven off in the form of sulphurous acid, while the sulphides obtained from the pyrites serve as fuel to maintain the heat necessary to continue the operation any length of time.

As long as a constant supply of sulphides of iron or iron and zinc arrives at the hearth no other constituents present will be appreciably oxidized, as it is well known that both iron and zinc are more readily oxidized than copper, silver, gold, nickel, and certain other metals. Consequently these will be all concentrated in the regulus, provided an excess of sulphide is always present.

When employing pyrites or residues therefrom containing very little silica it is advisable to add silicious and other slag-producing materials in order to form with the oxide of iron produced an easily-fusible liquid slag of such a gravity that the resulting regulus, being heavier, will, when no longer agitated, sink through and collect below the molten slag. I employ, in preference, metalliferous substances which will supply the necessary slag-producing materials, and I am thus enabled to utilize substances which contain valuable metals in such small quantities as to make them unfit for treatment by themselves, and render them suitable for treatment by ordinary methods. From time to time I withdraw the slag when the quantity becomes excessive and so saturated with oxide of iron that it does not readily take up that formed by the oxidation of the sulphide of iron.

Before introducing valuable metalliferous substances into the furnace I withdraw the slag or render it so basic by means of fluxes that the loss of the valuable metallic oxides is reduced to a minimum.

When I employ a fixed furnace, and continuously drive air through the sulphides contained therein, I find that the regulus withdrawn therefrom is mixed with slag. I therefore withdraw the regulus and slag at a temperature sufficiently high to permit them to separate before cooling, or I run them into another furnace where I maintain them fluid by extraneous heat, or into a modified Bessemer, in either of which I continue the oxidation by means of air. After withdrawing the regulus I recommence introducing pyrites, and the slag left in the furnace being very hot expels as free sulphur part of the sulphur originally combined with the iron in the pyrites.

With an ordinary Bessemer plant, and employing pyrites containing three and one-half per cent. of copper, I have obtained by actual experiments a regulus containing as much as 59.98 per cent. of copper, and forty-eight ounces, six pennyweights, and three grains of silver, and one ounce, six pennyweights, and three grains of gold per ton of regulus with a slag containing less than one-tenth per cent. of copper. When thus operating, the heat produced by the oxidation of the sulphides in the lower part of the furnace is sufficient not only to expel as free crude sulphur part of the sulphur combined with the iron in the pyrites, but there is a surplus of heat which I utilize for continuing the operation and for treating other metalliferous substances, and I thus obtain in groups as metals or in the form of sulphides, oxides, or as slag the metals originally contained in the pyrites or in the substances introduced into the furnace therewith.

I employ a hot blast of air when I desire to operate on a large proportion of metallic oxides as compared with the pyrites and sulphides employed; and when I desire to obtain a large proportion of free sulphur, instead of employing all the sulphur heat for treating metallic oxides I introduce superheated steam into the furnace in addition to the air, which latter I introduce as a hot blast, and in sufficient quantity to compensate for the reduction of temperature caused by the steam employed, and also to produce enough heat to expel as free sulphur about one-half of the sulphur originally combined with the iron in the pyrites introduced at the upper part of the furnace. By thus employing superheated steam I obtain free sulphur expelled from the pyrites, whereby protosulphide of iron is formed and an additional quantity of free sulphur liberated from the residual sulphides.

When pyrites is introduced into the furnace care must be taken to prevent access of a greater volume of air than is necessary for the formation of sulphurous acid and oxide of iron by the combustion of the sulphide of iron contained in the lower part of the furnace, and, in preference, I employ furnaces of sufficient depth or height, so that the free oxygen of the air blown in, neither comes into contact with the pyrites nor with the sulphur liberated, but is expended in the formation of oxide of iron and sulphurous acid, as before described. For the same reason it is desirable to introduce the pyrites in small pieces, and I thus utilize the small pyrites which has been hitherto wasted.

The high temperature at which the gases pass upward in the furnace assists the liberation of sulphur, and the gases carry with them the free crude sulphur as well as the metals and other substances volatilized.

By these means I utilize the sulphides as fuel, and obtain, first, free sulphur expelled from the pyrites, whereby protosulphide of iron is formed, and also a further proportion of sulphur, which is liberated when superheated steam is employed; second, nearly the whole of the remainder of the sulphur as sulphurous acid; third, the metals and other substances carried over by the vapors; fourth, the cupriferous sulphides which contain the silver and gold originally in the pyrites and other substances treated; fifth, a slag rich in iron from which metallic iron can be obtained.

When necessary I line the furnaces or other vessels, as well as the passages through which the gases pass, with materials which will protect them from the action of the sulphides or oxides present, and I make arrangements for collecting and separating the sulphur, sulphurous acid, and the substances carried over by the vapors.

I preferably pass the vapors through one or more chambers, so as to allow the metallic and other substances to deposit therein before separating the sulphur from the vapors.

When it is desired to produce sulphur practically free from arsenic I digest the free crude sulphur with a dilute solution of alkali or alkaline sulphide, preferably cold, and thus render the sulphide of arsenic soluble, so that by decantation or filtration it can be removed.

Being aware that it has before been proposed to treat pyrites by a blast of steam or air, I do not wish to claim this broadly, nor does this constitute the chief object of my invention.

I am aware that in the production of copper from pyrites the metallic product resulting from the smelting of the pyrites or the matte has been subjected to the action of a blast of air or steam for the purpose of desulphurizing said metallic products, and I do not wish to claim, broadly, the use of air or steam as a desulphurizing agent.

Having now described my invention, what I claim is—

1. In the smelting of ores, the method herein described of removing sulphur, arsenic, antimony, iron, and other volatile or more oxidizable constituents from the metal and utilizing the heat generated by the oxidation of such constituents, which method consists in forcing a blast of air or other oxidizing gas through the molten mass and conducting the volatile heated products generated by the oxidation thereof into a subsequent charge for the purpose of fusing the same without the use of extraneous fuel.

2. In the smelting of ores, the method of utilizing the heat produced by the oxidation of the sulphur, arsenic, iron, &c., and recovering sulphur therefrom, which consists of forcing a blast of air, or air and steam, through the molten mass, conducting the highly-heated gases and vaporized sulphur therefrom through a subsequent charge of ore for the purpose of fusing the same without the use of extraneous fuel, and then conducting the gases and vaporized sulphur into a collecting-chamber, wherein the sulphur and volatile condensable metallic sulphides or oxides will be deposited.

3. In the smelting of ores, the method of utilizing the heat produced by the oxidation of the sulphur, arsenic, iron, &c., contained therein, and for rendering the operation continuous, which consists in forcing a blast of air, or air and steam, through the molten mass, conducting the heated gases formed by the oxidation of the sulphur, arsenic, &c., through a subsequent charge of ore for the purpose of fusing the same without the use of extraneous fuel, and siphoning (tapping) off the molten metal from the metal-chamber.

4. In the extraction of copper and other metals, as also sulphur, from pyrites, the continuous process hereinbefore described, which consists in first forming a bath of molten sulphide of iron, as set forth, then passing an oxidizing gaseous agent, such as a blast of air, or air and steam, through the liquid, and gradually introducing the pyrites, or the pyrites and other metalliferous or slag-producing substances, into it, whereby part of the sulphur is distilled by the heat of the bath while the pyrites are melted in said bath, of sulphide under the action of said blast of air, or air and steam, and part of the remaining sulphur is obtained in the form of sulphurous acid or sulphureted hydrogen, while the metals less oxidizable than iron originally contained in the pyrites and other substances employed are obtained as a regulus and the combustion is maintained by the oxidation of the pyrites introduced, and the latter is thus utilized in lieu of carbonaceous fuel, as set forth.

In witness that I claim the foregoing I have hereunto set my hand this 26th day of February, 1879.

JOHN HOLLWAY.

Witnesses:
EDWARD W. PHILLIPS,
JAMES J. SNOW.